United States Patent
Lim

(10) Patent No.: US 7,333,452 B2
(45) Date of Patent: Feb. 19, 2008

(54) METHOD AND SYSTEM FOR PACKET DATA TRANSMISSION

(75) Inventor: Byung Keun Lim, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 941 days.

(21) Appl. No.: 10/165,963

(22) Filed: Jun. 11, 2002

(65) Prior Publication Data

US 2002/0186696 A1    Dec. 12, 2002

Related U.S. Application Data

(60) Provisional application No. 60/297,270, filed on Jun. 12, 2001.

(51) Int. Cl.
*H04Q 7/00* (2006.01)

(52) U.S. Cl. .................. 370/331; 370/338; 370/389

(58) Field of Classification Search .................. None
See application file for complete search history.

(56) References Cited

U.S. PATENT DOCUMENTS

| 6,785,823 | B1 * | 8/2004 | Abrol et al. ................ 726/7 |
| 6,876,640 | B1 * | 4/2005 | Bertrand et al. ............. 370/331 |
| 6,885,861 | B2 * | 4/2005 | Koskelainen ............. 455/414.2 |
| 6,985,479 | B2 * | 1/2006 | Leung et al. ............... 370/352 |
| 6,999,991 | B1 * | 2/2006 | Ikeda ........................ 709/206 |
| 7,079,499 | B1 * | 7/2006 | Akhtar et al. .............. 370/310 |
| 2002/0154627 | A1 * | 10/2002 | Abrol et al. ................ 370/352 |

OTHER PUBLICATIONS

TSGS, "TSG SA WG2: S2 Push Service Drafting Group", Dec. 11-14, 2000, pp. 1-4.*

* cited by examiner

*Primary Examiner*—Jay K. Patel
*Assistant Examiner*—Jung Park
(74) *Attorney, Agent, or Firm*—Ked & Associates, LLP

(57) ABSTRACT

A system and method for transmitting packet data in a communications system assigns an IP address to a terminal based on a network access identifier corresponding to the terminal, and then sends packet data to the terminal using the IP address. The terminal may be a simple IP user terminal or a mobile IP user terminal, and the packet data being sent preferably corresponds to an IP push service. In order to send the packet data, a protocol link is established between the terminal and network. Transmission of packet data on this link may be managed using an information table which relates information corresponding to the IP address to the network access identifier. This table is updated with information relating to the IP address when, for example, the network access identifier changes, when a point-to-point protocol timer expires, when an IP registration expires a location of the terminal changes. Upon expiration of any of the aforementioned time periods, the link between the terminal and network may be eliminated, thereby freeing the IP address for use by other terminals in the system.

26 Claims, 4 Drawing Sheets

METHOD AND SYSTEM FOR PACKET DATA TRANSMISSION

CROSS-REFERENCE TO RELATED APPLICATIONS

This application claims the benefit of U.S. Provisional Patent Application Ser. No. 60/297,270, filed on Jun. 12, 2001. The contents of this application is incorporated herein by reference.

BACKGROUND OF THE INVENTION

1. Field of the Invention

The present invention relates to a mobile telecommunication system, and more particularly to a method and system for transmitting packet data.

2. Background of the Related Art

In cellular/PCS/IMIT-2000 mobile telecommunication systems, when a user of a mobile station (MS) wants service accessed through the internet, a point-to-point (PPP) link or a link which enables exchange of internet IP datagrams is established between the mobile station and a packet data serving node (PDSN) through a base transceiver system (BTS) and a base station controller (BSC). An IP address is then allocated by the PDSN or a home agent (HA) to the mobile station through the link. This address allows the mobile station to communicate with an IP host/server on the internet.

In order to authenticate internet network access and handle charging fees of the mobile station, a network access identifier (NAI) of the mobile station is transferred to an authentication, authorization, accounting (AAA) server when a link is established between the MS and PDSN. The AAA server controls the authentication, authorization and accounting of the corresponding terminal based on the NAI of each mobile station requesting internet service.

When the mobile station is connected to the PDSN through a PPP link, the mobile station communicates with the IP host/server freely. When the IP host/server is going to provide the mobile station with IP push service (provided randomly by a service provider at the request of an MS user), the IP push server sends an IP datagram to the IP address of the corresponding mobile station user as a destination address, provided there is an IP address identifying a fixed MS user.

However, a simple IP user (to whom a dynamic address is allotted by a local PDSN) and a mobile IP user (to whom an IP address is allotted dynamically every access to the internet) are unable to receive IP push service since the IP push server does not recognize the IP address allotted when the mobile station establishes a link to the PDSN. This is because the simple IP user and the mobile IP user have no permanently-allotted IP address as a result of the dynamic HA allotment. The method according to a related art is therefore unable to send an IP datagram substantially by having the IP push server identify the IP address of a mobile station user.

SUMMARY OF THE INVENTION

One object of the present invention is to provide a packet data transmission method and system that substantially obviates one or more problems of the related art discussed above.

Another object of the present invention is to provide network (e.g., IP) service to a user terminal which, for example, may be a simple IP user terminal or a mobile IP user terminal.

Another object of the present invention to provide IP push service to simple TIP user terminals and mobile IP user terminals.

Another object of present invention to provide a packet data transmission method and system which effectively manages changes of network addresses of user terminal requesting network service.

Another object of the present invention to provide a packet data transmission method and system in which packet data is transferred to a target terminal using a changed network address of the terminal.

These and other objects of the present invention are achieved by providing a packet data transmission method including assigning an IP address to a terminal based on a network access identifier corresponding to the terminal, and then sending packet data to the terminal using the IP address. The terminal may be a simple IP user terminal or a mobile IP user terminal, and the packet data being sent preferably corresponds to an IP push service. In order to send the packet data, a protocol link is established between the terminal and network. Transmission of packet data on this link may be managed using an information table which relates information corresponding to the IP address to the network access identifier. This table is updated with information relating to the IP address when, for example, the network access identifier changes, when a point-to-point protocol timer expires, when an IP registration expires a location of the terminal changes. Upon expiration of any of the aforementioned time periods, the link between the terminal and network may be eliminated, thereby freeing the IP address for use by other terminals in the system.

According to one aspect of the invention, the service provider connected to the network inquires of an IP address corresponding to a network access identifier of a specific terminal regardless of a request of the terminal.

The present invention is also a packet data transmission system which includes a packet data serving node for carrying out routing of a packet provided to/from a terminal and establishing/releasing a link to the terminal. The packet data serving node produces a network access identifier NAI of the link-established/released between the terminal and IP information allotted/withdrawn to the network access identifier. The system also includes a domain name system which stores the produced network access identifier and IP information, and an authentication server for carrying out authentication and accounting of the link-established terminal and for requiring update from the packet data serving node to the domain name system in accordance with the network access identifier and IP information.

Preferably, a point-to-point protocol link is established between the terminal and packet data serving node, and the packet data serving node allots a simple IP to the terminal in accordance with a packet service request of the terminal. The packet data transmission system may further include a home agent allotting a mobile IP in accordance with an IP registration request of the terminal. Preferably, one of simple and mobile IP is allotted to or withdrawn from the terminal. The domain system may update the IP corresponding to each network access identifier in accordance with allotment/count of the IP, and may update the IP corresponding to each network access identifier when a point-to-point protocol timer ends. The domain system may also update the IP corresponding to each network access identifier when a valid IP registration time is expired. The domain system may also update the IP corresponding to each network access identifier when the terminal moves to other data service area.

According to another aspect of the invention, the domain name system may further include a packet service providing server inquiring an IP address corresponding to a network access identifier of a specific terminal so as to provide data service regardless of a request of the terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The present invention is a system and method for performing data packet transmissions using a mobile domain name system (MDNS) which provides dynamic domain name service for an NAI (network access identifier) assigned to a mobile station. This service is provided by, first identifying a mobile station and/or a mobile station user and, then, using an NAI assigned to the mobile station as a basis for generating a domain name for providing network service. The invention is dynamic in that the MDNS updates IP address information whenever the IP (internet protocol) address allotted to the NAI is changed by moving together with a HAAA (home authentication, authorization, and accounting) server. The MDNS also generates a message, generated by a PDSN (packet data serving node) based on the NAI, which informs the HAAA server of the IP address of the mobile station as soon as the IP address is confirmed.

Reference will now be made to the embodiments of the present invention, examples of which are illustrated in the accompanying drawings.

Figure 1:
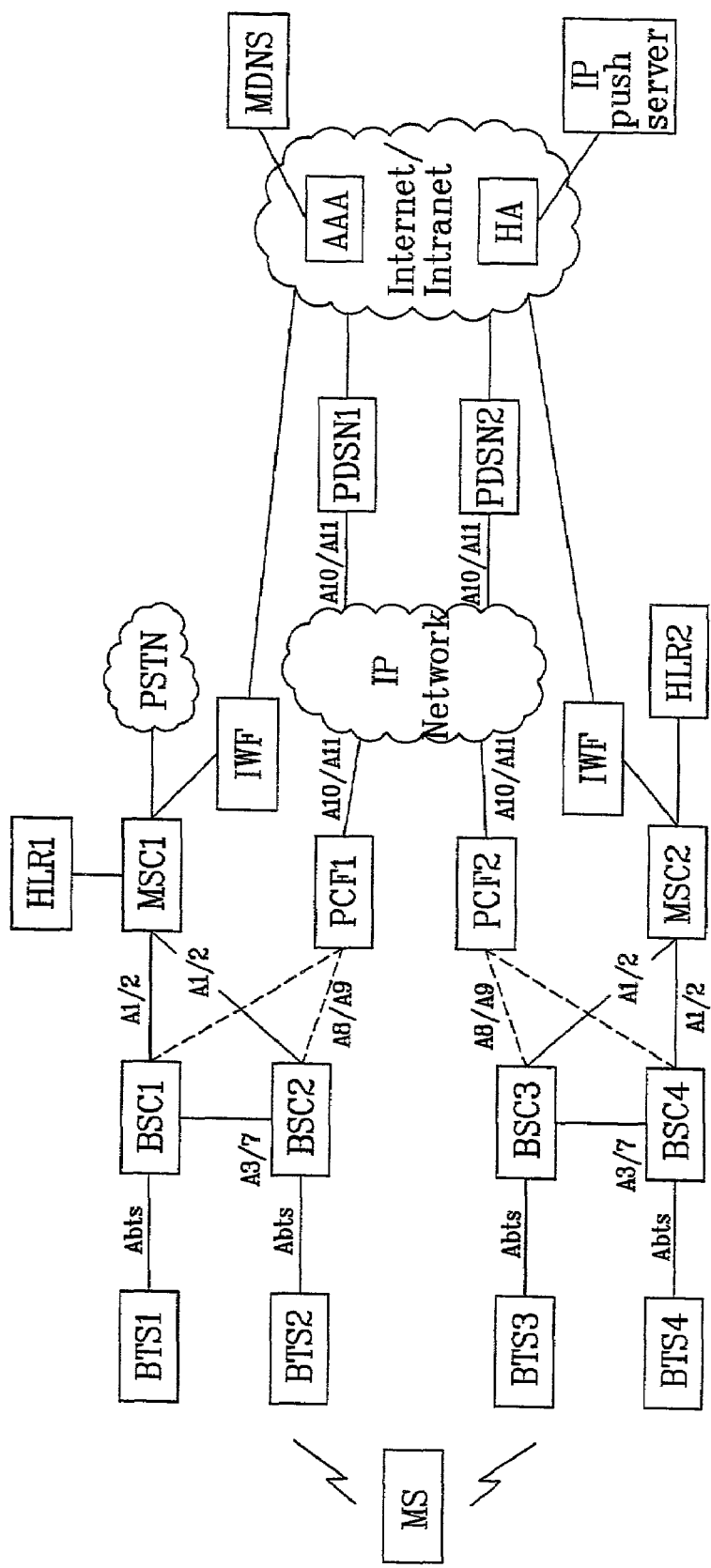
FIG. 1 shows a system for providing wireless internet service according to one embodiment of the present invention.

FIG. 1 shows one embodiment of a system for providing wireless network service to a mobile telecommunication system according to the present invention. This network service may be service from any one of a variety of networks including global, wide-area, and local-area networks. In the present embodiment, an internet service is provided. This system, which is preferably a cellular/PCS/IMT-200 mobile telecommunication system, includes a mobile station (MS) terminal, a base transceiver system for transmitting and receiving wireless signals, a BTS system controller (BSC) for controlling the BTS and processing wireless signals, a mobile switching center (MSC) for carrying out call exchange and wireless resource allotment, an interworking function in the form of a wireless data apparatus connected to the MSC to operate and connect with a PSTN (public switching telephone network)/internet, and a home location register (HLR) for storing information of the MS. The system also includes a PDSN (packet data serving node) for carrying out routing on packets provided to/from the terminal, establishing/releasing a link to the terminal, and producing an NAI of the established/released terminal and IP information allotted/withdrawn to the NAI.

Also included is a packet control function (PCF) for carrying out data interexchange from the PDSN to the MS, and a mobile domain name system (MDNS) in the form of a domain name server of the MS which uses information from an HAAA server, an HA, and the NAI to generate a domain name of the MS and a user. The HAAA server carries out authentication, authorizations, and accounting functions for the MS and transfers the NAI and IP information from the PDSN to the MDNS. The HA allots a mobile IP in accordance with an IP registration request of the terminal. And the NAI is used as a network access identifier of a mobile data terminal user or the MS.

The MDNS preferably updates IP address information of the MS on a realtime basis as well as domain name resource records (hereinafter abbreviated RR). In accordance with the present invention, the NAI is used as a basis for generating the domain name. Therefore, the IP address corresponding to the NAI is stored in the MDNS, and the MDNS is provided with information from the AAA server whenever the IP addresses corresponding to the respective NAIs are changed.

The PCF (packet control function) collects accounting information of the data packets of the mobile station (a terminal) transferred through the corresponding link, and transfers the accounting information to the PDSN once a PPP link is established between the mobile station and PDSN. The accounting information may include wireless link record information in a wireless interval.

The PDSN sends an accounting request message for initiating the accounting to the AAA server. The AAA server then carries out the accounting of the mobile station.

The NAI of the mobile station user is stored in the AAA server of a subscribed wireless agent or a wireless ISP (internet service provider), which corresponds to the HAAA (home AAA) server. When the MS gains access to the internet, for example, by visiting a cellular/PCS/IMT-2000 business network forwireless data access of another agent to which the HAAA of the MS does not belong, an AAA server in a network of another agent is called a visitor AAA (VAAA) server. When the MS pays a visit to the other agent's network, the NAI of the mobile station is authenticated, authorized and accounted through the communication between the VAAA and HAAA servers.

The process of changing the IP address in the MDNS is carried out differently depending upon whether the user is a simple IP user or a mobile IP user. Each of these cases is discussed below.

Figure 2:
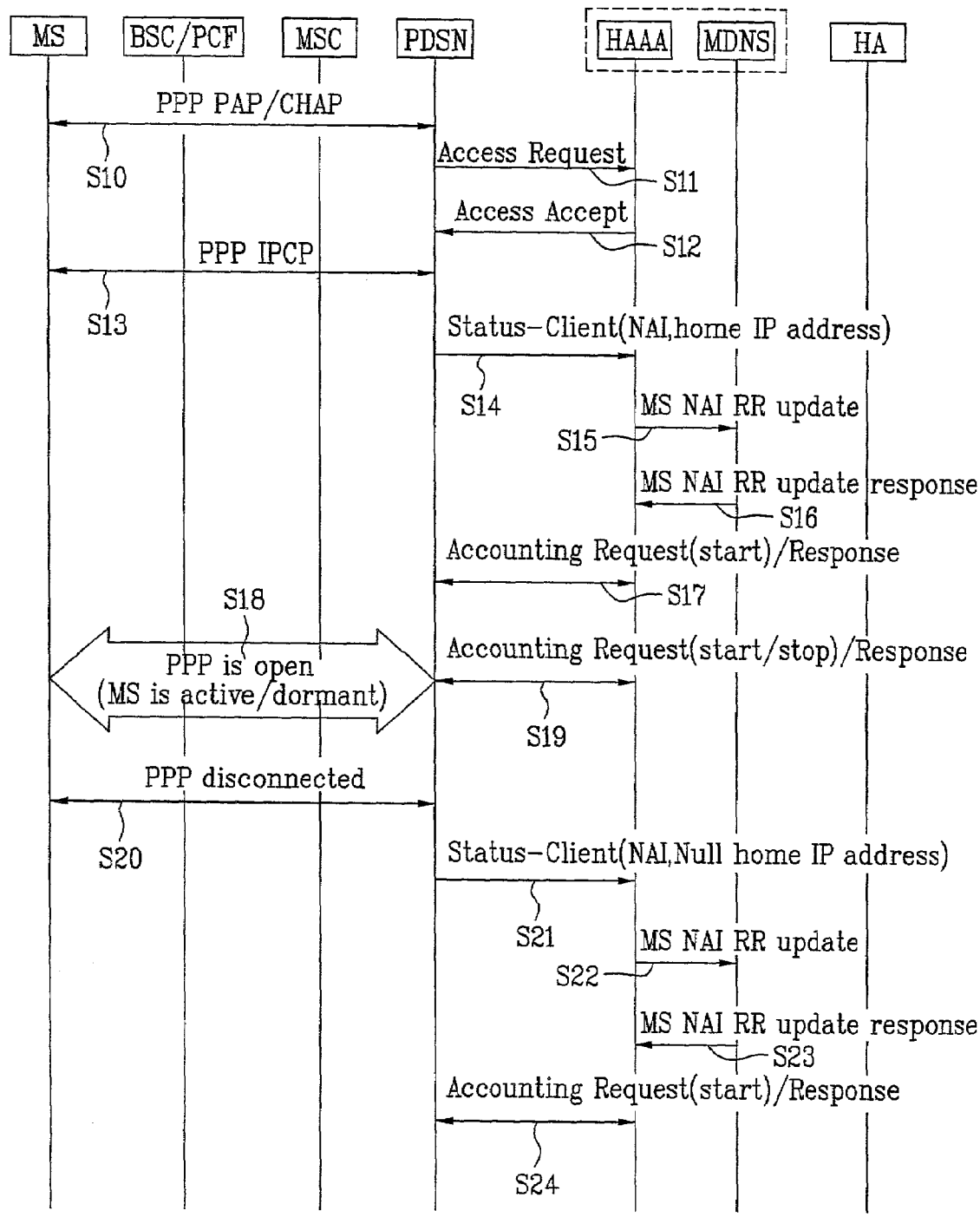
FIG. 2 shows steps included in a method for providing network (e.g., internet) access to a simple IP user terminal and for updating MDNS resource records according to one embodiment of the present invention.

FIG. 2 shows a method for establishing internet access for a simple IP user and for updating the resource records of the MDNS in accordance with one embodiment of the present invention. In this figure, a CHAP (challenge handshake authentication protocol)/PAP (password authentication protocol) is carried out between MS and PDSN during LCP (link control protocol) initialization (S10). The PDSN sends a request for an NAI to the HAAA server (S11). The HAAA server sends an allowance message for the NAI user's request to the PDSN (S12), and the PDSN approves of providing internet access to the MS by judging allowance corresponding to the NAI sent by the HAAA server. An IP address is then allotted to the MS at a step of IPCP (IP control protocol) for establishing a PPP link to the mobile station terminal (S13).

After an IP address has been allotted to the MS, if the MS does not move to other PDSN region, a PPP timer still runs or a user of the MS keeps on using the packet service. The PPP link remains unchanged, and the allotted IP address is used continuously without change. Hence, the PDSN sends a message for notifying the IP address allotted to the MS to the HAAA server by having the NAI and home IP address included in the message (S14).

The HAAA server transmits a resource record (RR) update message of an NAI domain name to MDNS Introduced inside or outside of the HAAA server by an RFC 2136 method developed by IETF. This results in having MDSN update the IP address of the NAI (S15).

As the MDNS carries a response message of the IP address update to an HAAA server, processing of allotting IP address to NAI is completed (S16).

In the subsequent steps, the PDSN sends a message of initiating accounting of HAAA server (S17). Simultaneously, data is transferred between the mobile station and the PDSN after establishment of a link, while the MS repeats dormant/active states in accordance with the data receive-send or not, whereby accounting information is exchanged between the PDSN and the AAA server (S18)(S19).

In the case of establishing internet access to a simple IP user, a PPP link for packet service is automatically terminated at the end of a timer when no data exchange occurs between the MS and the PDSN for a predetermined period of time. The allotted IP address is then drawn back. After this, another IP address is allotted for another following access.

Once the PPP link is released (S20), the PDSN sends a message immediately to inform the HAAA server of the release of the IP address allotted to NAI (S21). The HAAA server then sends an NAI RR update message to notify the MDNS that the IP address allotted to the corresponding NAI is released as a null state (S22). The MDNS then informs the HAAA server of response and handling (S23). The process for updating the resource records to reflect the release of the NAI domain name is then completed.

Subsequently, the PDSN carries out the accounting handling by transferring accounting information to the HAAA, in which a Status-Client message and an accounting message may be sent to the NAI by the PDSN in a random order.

Figure 3:
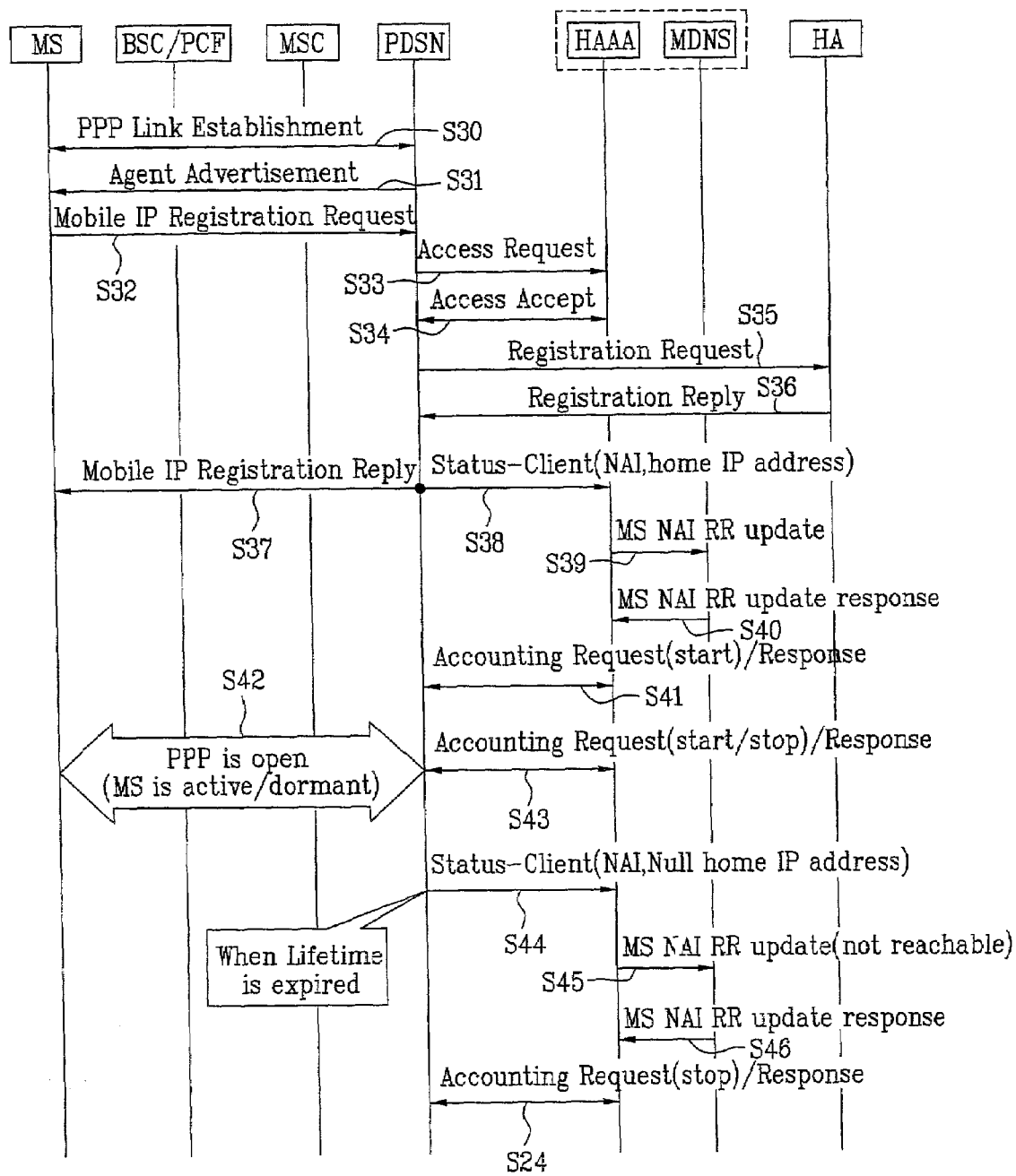
FIG. 3 shows steps included in a method for providing network (e.g., internet) access to a mobile IP user terminal and for updating MDNS resource records according to an embodiment of the present invention.

FIG. 3 shows a method for establishing internet access for a mobile lIP user and for updating the resource records of the MDNS in accordance with an embodiment of the present invention. In the case of a dynamic mobile IP user, while a PPP link is established between the MS and the PDSN (S30), the PDSN broadcasts an agent advertisement message periodically (S31). The MS checks transfer between subnets through the agent advertisement message, acquires COA (care of address) information from the PDSN in an external network, and sends a registration request message to the HA server using the COA information (S32 to S35).

The HA allots an TIP address to the dynamic mobile TIP user through a registration reply message (S36). Then, the PDSN which receives the message recognizes the IP address allotted to the MS and transfers a mobile IP registration reply message to the MS (S37). Simultaneously, the PDSN sends a Status-Client message to inform the HAAA server of the IP address allotted to the NAI (S38). The HAAA updates the MDSN with an IP address based on the NAI by sending an RR update message of a domain name of the NAI to the MDNS realized inside or outside HAAA server itself (S39). The MDNS transfers a reply message concerning the IP address update to an HAAA server, thereby completing the handling of the IP address allotted to NAI (S40).

Therefore, the PDSN sends a message of initiating the accounting to HAAA (S41). Simultaneously, data is transferred between the MS and the PDSN after establishing a link, and the MS repeats dormant/active states based on whether the data receive-send is carried or not, whereby accounting information is exchanged between PDSN and AAA (S42) (S43).

In the case of the mobile IP user, when the life of a valid registration time expires after the MS establishes a PPP link at the PDSN, the PPP link is released unless another registration is newly made. After termination of the valid registration time, the PDSN sends a Status-Client message to update the DNS source record information of the HAAA with the NAI for the MS, thereby informing the release of the IP address allotted to NAI (S44). The HAAA then sends an NAI RR update message to notify the MDNS that the IP address allotted to the corresponding NM is released as a null state (S45). Then, the MDNS informs the HAAA of response and handling (S46). The process for updating the resource records to reflect the release of the NAI domain name is then completed.

Subsequently, the PDSN carries out the accounting handling by transferring accounting information to the HAAA server in which a Status-Client message and an accounting request message may be sent to the NAI by the PDSN in a random order.

Figure 4:
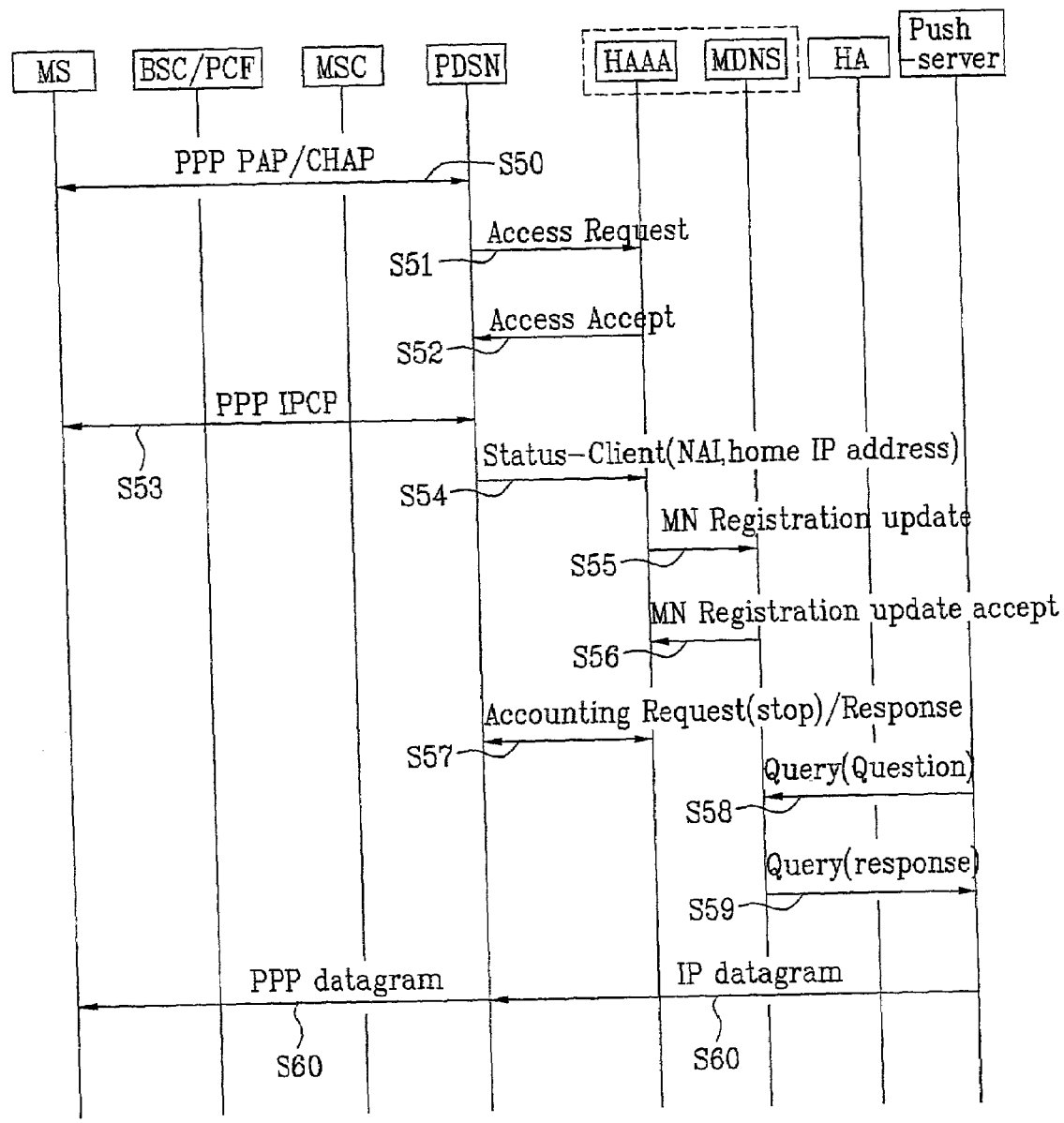
FIG. 4 shows steps included in a method for providing IP push service for a simple IP user terminal according to an embodiment of the present invention.

FIG. 4 shows a method for processing of an IP push service for a simple IP user according to the present invention. Here, it is assumed that a simple IP user registers IP push service in an IP push server through an NAI.

In an initial step, a CHAP (challenge handshake authentication protocol)/PAP (password authentication protocol) is carried out between the MS and the PDSN during LCP (link control protocol) initialization (S50). The PDSN sends a request for an NAI to the HAAA server (S51). The HAAA server sends an allowance message for the NAI user's request to the PDSN (S52), and the PDSN approves of providing internet access to the MS by judging allowance corresponding to the NAI sent by the HAAA server. An IP address is then allotted to the MS at a step of IPCP (IP control protocol) for establishing a PPP link (S53).

The PDSN sends a Status-Client message to inform the HAAA of the IP address allotted to NAI (S54).

The HAAA transmits a MN (mobile node) registration update message of an NAT domain name to the MDNS realized inside or outside of the HAAA itself, thereby updating the IP address of NAI (S55). As the MDNS carries a response message of the IP address update to an HAAA server, the processing of the IP address allotted to NAI is completed (S56). Therefore, the PDSN sends a message of initiating the accounting of the HAAA (S57).

If an IP push server requires the MDNS to provide domain name service based on the NAI when an IP push service event of the corresponding NAI occurs in the IP push server (S58), the MDNS sends an IP address of the corresponding NAI (S59). The corresponding push server then sends a datagram for the push service to the MS in accordance with the transferred IP address (S60).

In sum, an IP server carries out IP push service based on an NAI of a user by taking the NAI as a domain name of the MS or an MS user. In this case, the MDNS takes charge of domain name service of the domain name. Thus, when an IP push service event takes place, the IP push server sends IP datagrams to a mobile station by finding the IP address which is presently used by the MS corresponding to the NAI by means of asking MDNS of domain name service. Through this method, IP service is available regardless of the IP address which is frequently changed such as a simple IP user.

Accordingly, the present invention enables to provide an MS user, who gains access to internet using dynamic IP, in MS users of cellular/PCS/IMT-2000 systems with IP push service. Moreover, the present invention may provide a variety of other internet services such as VoIP based on NAI.

It is also noted that in some proposed systems, the Accounting Request (start/stop) message based mobile stations's home IP address notification to the AAA server has at least one signficant drawback. Specifically, while the mobile station maintains the PPP link with the PDSN, the PDSN can send the Accounting Request (stop) message to the AAA server accoring to the 9.5.5 and 9.5.9. This stop message triggers the MDNS clearing the mobile station's allocated address even though the mobile station holds the same IP address until the next subsequent Accounting Request (start) message arrives.

In order to solve this problem, the present invention sends the mobile station's IP address to the AAA server independent of the Accounting Request messages. In particular, the Inventors have found that there is a Status-Client message code (code 13) in the messsages of the RFC2138. Using this message with proper attributes such as User-Name for NAI and Framed-IP-address for the mobile station's IP address, the PDSN of the invention can send the mobile station's IP address to the AAA server faster and more efficiently. Then, the Home AAA server may send a DNS update message to the mobile DNS server according to the standard RFC2136 for dynamic update in the DNS.

The forgoing embodiments are merely exemplary and are not to be construed as limiting the present invention. The present teachings can be readily applied to other types of apparatuses. The description of the present invention is Intended to be illustrative, and not to limit the scope of the claims. Many alternatives, modifications, and variations will be apparent to those skilled in the art. For example, while the system and method of the invention has been described as providing internet network service, those skilled in the art will appreciate that service from any other type of network may be provided, including but not limited to LANs, WANs, and/or other types of packet-based data networks. Accordingly, the network access identifier and network address assigned to the mobile station will be associated with those other types of networks.

What is claimed is:

1. A method for transmitting packet data in a communications system, comprising:
   assigning an IP address to a network access identifier corresponding to a mobile terminal;
   sending data to the terminal over a link using said IP address;
   detecting release of the IP address assigned to the NAI of the mobile terminal after termination of the link; and
   changing IP address information stored in a mobile domain name system after said release, wherein different procedures are used to assign the IP address and change the IP address information stored in the mobile domain name system for different types of IP users, wherein said method further includes:
   sending an accounting request message to an authentication, authorization, and accounting server after said release, and
   performing an accounting operation in response to the accounting request message, wherein information including the IP address of the terminal is sent to the authentication, authorization, and accounting server independent of an accounting request message.

2. The method of claim 1, further comprising:
   establishing a point-to-point protocol link between the terminal and a network associated with said network access identifier.

3. The method of claim 1, wherein said assigning step includes assigning an IP address to a simple IP user of the terminal.

4. The method of claim 1, wherein said assigning step includes assigning an IP address to a mobile IP user of the terminal.

5. The method of claim 1, wherein said changing includes updating information relating to the IP address of the mobile terminal when said network access identifier for the terminal changes.

6. The method of claim 1, further comprising:
   providing an information table which includes information relating the IP address to said network access identifier.

7. The method of claim 6, wherein said changing includes updating information relating to the IP address in said table when said network access identifier for the terminal changes.

8. The method of claim 7, wherein said updating step is performed when a point-to-point protocol timer expires.

9. The method of claim 7, wherein said updating step is performed when an IP registration expires.

10. The method of claim 7, wherein said updating step is performed based on changes in a location of the terminal.

11. The method of claim 1, further comprising:
    receiving a request from an IP service provider for the IP address of the terminal; and
    sending data from the IP service provider to the terminal using the IP address.

12. The method of claim 11, wherein the request from the IP service provider is made regardless of whether the terminal requested service from the IP service provider.

13. A system for transmitting packet data, comprising:
    a packet data processor which assigns a network access identifier to a terminal;
    a domain name processor which generates and assigns an IP address for the network access identifier of the terminal; and
    a server to store the network access identifier assigned to the IP address,
    wherein the domain name processor changes information relating to the IP address when a data link to the terminal is released, the packet data processor and domain name processor performing different procedures to respectively assign the IP address and change the IP address information for different types of IP users, said method further comprising:
    an authentication, authorization, and accounting (AAA) server which receives an accounting request message after said release, said AAA server performing an accounting operation in response to the accounting request message, and wherein information including the IP address is received by the AAA server independent of an accounting request message.

14. The system of claim 13, wherein the packet data processor is connected to the terminal by a point-to-point protocol link.

15. The system of claim 13, wherein the IP address assigned to the terminal is a simple IP address assigned in accordance with a packet service request from the terminal.

16. The system of claim 13, further comprising:
a home agent which allots the IP address to the terminal in accordance with an IP registration request from the terminal.

17. The system of claim 13, wherein one of a simple IP address and a mobile IP address is assigned to the terminal.

18. The system of claim 13, wherein in the domain name processor stores information in a table relating said network access identifier to the IP address assigned to the terminal.

19. The system of claim 13, wherein the domain name processor updates the IP address assigned to the terminal in accordance with changes in said network access identifier.

20. The system of claim 13, wherein the domain name processor updates the IP address assigned to the terminal when a location of the terminal changes.

21. The system of claim 13, wherein the domain name processor updates the IP address of the terminal in accordance with an allotment/count of the IP address.

22. The system of claim 13, wherein the domain name processor updates the IP address of the terminal when a point-to-point protocol time expires.

23. The system of claim 13, wherein the domain name processor updates the IP address of the terminal when an IP registration time expires.

24. The system of claim 20, wherein the domain name system includes:
a processor which sends a request from an IP service provider requesting the IP address of the terminal, said packet service providing server sending said request regardless of whether the terminal requested service from the IP service provider.

25. A The method for providing information in a communications system, comprising:
assigning a network access identifier to a mobile terminal requesting an IP push service;
generating an IP network address for the terminal, the IP address being allotted to the network access identifier; and
providing the IP push service to the terminal based on the IP network address, said providing including:
determining that the IP network address has been released from the terminal,
identifying the network access identifier of the terminal;
determining a new IP network address which has been assigned to the network access identifier of the terminal; and
providing the IP push service to the terminal based on the new IP network address assigned to the network access identifier, wherein the IP push service is provided to the terminal based on the network access identifier irrespective of subsequent changes in the IP network address.

26. The method of claim 25, wherein said providing include:
sending one or more IP datagrams to the terminal based on the new IP network address.

* * * * *